Figure 1:
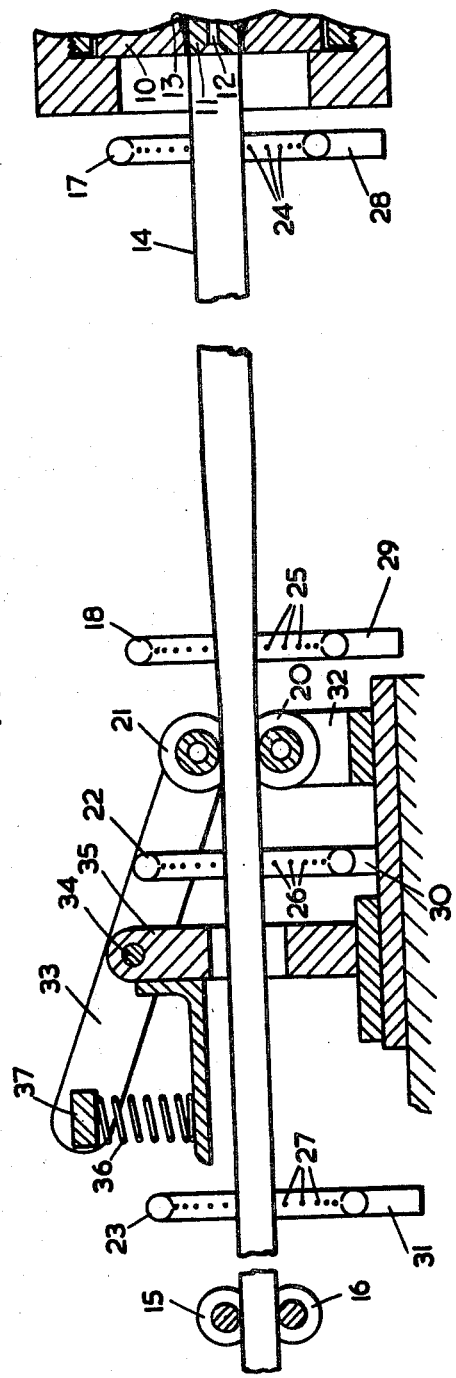

Jan. 26, 1960  E. H. A. LAMPARD ET AL  2,922,194
PROCESS FOR THE MANUFACTURE OF SELF-SUPPORTING
TUBES OF THERMOPLASTIC MATERIAL
Filed Oct. 27, 1953

E.H.A. LAMPARD
B. SHAW
INVENTORS

ATTORNEYS

United States Patent Office 2,922,194
Patented Jan. 26, 1960

2,922,194

PROCESS FOR THE MANUFACTURE OF SELF-SUPPORTING TUBES OF THERMOPLASTIC MATERIAL

Edward Henry Arthur Lampard and Bernard Shaw, Wrexham, Wales, assignors to British Celanese Limited, a corporation of Great Britain Application October 27, 1953, Serial No. 388,552

Claims priority, application Great Britain October 28, 1952

6 Claims. (Cl. 18—57)

This invention relates to the manufacture of articles of thermoplastic material and especially to the manufacture of tubes of thermoplastic material by hot, solventless extrusion of the material.

It is well known to form tubes of thermoplastic material such as cellulose acetate by extruding the hot material through a tubular die in the absence of volatile liquids, drawing the tube away from the die, and progressively cooling it to a temperature at which it is no longer plastic, on its way to the region in which it is engaged by the drawing means.

Owing to the tendency of the extruded tube to undergo distortion on leaving the die, difficulty has been experienced in making tubes of predetermined cross-sectional shape by this method. Many rather eleborate processes and forms of apparatus have been devised to meet this difficulty. The best methods we have hitherto found to achieve the desired result are described in United States patent applications S. Nos. 243,488, filed August 24, 1951, now Patent No. 2,708,772, and 301,088, filed July 26, 1952, now Patent No. 2,814,071. According to the first of these specifications the extruded material is caused to pass while still plastic over a mandrel comprising a shaping member for shaping the inside of the tube to the desired cross-section, carried by a stem projecting from the central core of the die, said plastic tube is kept out of contact with the stem by a cushion of gaseous medium and is cooled while in contact with the shaping member so that on passing the said member it retains the shape imparted thereby, and the cooled tube is carried forward by tractive means contacting it beyond the point where it has ceased to be plastic. According to the second of these specifications the extruded material is drawn while still plastic across a plurality of shaping edges (e.g. the edges of a series of discs) spaced along the interior of the tube within a region in which the tube is progressively cooled to a temperature at which it is no longer plastic, the outside of the tube being unconfined throughout said region. Earlier proposals for obtaining the desired results are described in these specifications.

The methods referred to above have been directed primarily to obtaining rigid cylindrical tubes. Methods have also been described for obtaining cylindrical tubes that are sufficiently flexible to be flattened and rolled-up flat without damage. The making of such tubes presents less difficulty. Various methods have been described in which the tube at successive points along its path from the extrusion station is expanded by air supplied by a passage through the die core, drawn through a further die which controls the final dimensions, flattened to maintain the air pressure in the tube behind the point in which flattening occurs, and rolled-up flat.

The present invention provides a process and apparatus for making, to predetermined cross-sectional shape, tubes which are insufficiently limp or flexible to be flattened without damage. The method and apparatus are particularly suitable for making tubes of cross-sectional shapes other than circular, e.g. tubes of elliptical or polygonal cross-section. The apparatus of the invention is simple and inexpensive and the process is easy to operate.

According to the process of the invention, in the manufacture of self-supporting tubes of thermoplastic material by extruding the material hot in the absence of volatile liquids, progressively cooling it to a temperature at which it is no longer plastic, while drawing it away from the extrusion point by traction applied in a region in which it has ceased to be plastic, the cross-sectional shape of the tube is controlled by drawing it, on its way to said region, through an aperture between two endless surfaces (e.g. the surfaces of a pair of contacting, profiled rolls, referred to below as "the shaping rolls") each surface being freely rotatable about an axis of symmetry embraced by said surface and perpendicular to the direction of travel of the tube, each surface making substantially line contact with the tube in a plane substantially perpendicular to said direction, and controlling the temperature of the tube so that on reaching said aperture it is soft enough to be deformed, but is not limp, and on leaving the aperture it is hard enough to retain its cross-sectional shape. Preferably the cross-sectional shape of the tube at the extrusion point is circular and the tube is stretched during its travel to the aperture.

Apparatus suitable for carrying out the process of the invention comprises: means for extruding the material hot in tubular form in the absence of volatile liquids, means for drawing the extruded tube away from the extrusion die, means for progressively cooling the tube between the die and the draw-off means so that the tube is no longer plastic when it reaches said means, two contacting, freely rotatable rolls situated one on either side of the path of the tube to the draw-off means, with their axes perpendicular to said path, said rolls being profiled to provide an aperture of the same shape as is required in the cross-section of the tube, and means for controlling the temperature of the tube so that on reaching said aperture it is soft enough to be deformed, but is not limp, and on leaving the aperture it is hard enough to retain its cross-sectional shape. Preferably the extrusion means comprises a screw extruder provided with a tube-die adapted to extrude a tube of circular cross-section and of greater circumference than the perimeter of the aperture between the shaping rolls. Tubes the cross-sectional shape of which is a non-circular closed figure without re-entrant angles, e.g. an ellipse, may be obtained by employing a pair of rolls profiled to give an aperture of that shape. When tubes of circular cross-section are required, the rolls are profiled to provide a circular aperture. Drawing the material in the appropriate state of plasticity through such an aperture can correct slight distortions in the shape of the tube that have occurred earlier in its path.

The rolls are preferably mounted so as to be capable of moving apart to accommodate themselves to any slight variations in the cross-sectional dimensions of the tube, and are urged together by yieldable means, preferably spring means. The necessary control of the temperature may be effected with the aid of rings of air jets round the path of the tube at suitable intervals. It is especially necessary to cool the tube rapidly during, and especially after, its passage between the rolls, so that no further change in shape occurs. A suitable arrangement of cooling rings is: one very close to the extrusion die; one 12–18" beyond the extrusion die and 2 to 4" behind the shaping rolls and two in front of and near to the shaping rolls, each ring being supplied with air at atmospheric temperature from a reservoir at constant pressure through a valve controllable by the operator. To assist in this cooling it is of advantage that the rolls should be capable of rapidly conducting heat away from the tube. They are therefore preferably metallic and may be internally cooled by circulating water through them. The tension necessary to draw the tube through the shaping rolls is preferably applied by a set of driven rolls (the "draw-rolls") which grip the tube in the region in which it is no longer plastic. To obtain a good grip of the tube without distorting it these rolls may be rubber covered and suitably profiled. To enable the rate at which the tube is drawn through the shaping rolls to be adjusted to give the desired dimensions, the draw-off rolls should be driven through infinitely variable gear.

Thermoplastic compositions suitable for hot extrusion, and especially compositions in which the thermoplastic is cellulose acetate, commonly contain plasticizers which undergo some volatilisation at the temperature of extrusion. The vapour formed passes along the tube and may condense in the cooler parts thereof. We have found it desirable to sweep these vapours out of the tube by maintaining a current of air therein. The air may be introduced through a passage in the core of the die. It is preferably pre-heated, e.g. to 40 to 60° C. The air pressure in the tube may be slightly above atmospheric pressure (to balance the tendency of the tube to collapse) but it must not be sufficiently high to cause expansion of the tube. The slight super-atmospheric pressure required in the tube could, of course, be maintained with little expenditure of air if the tube were partly blocked, say by a loosely fitting plug suitably supported inside the tube beyound the shaping rolls. To obtain the desired scouring effect of the air stream, however, it is better to avoid any such restriction in air flow and to maintain a copious air stream. It will be understood that instead of air an inert gas such as nitrogen or carbon dioxide can be employed. The tendency of the tube to collapse on leaving the die could also be counteracted by providing a support (e.g. one or more discs carried by a mandrel), within the tube a short distance from the die, for example, as described in application S. No. 243,488, referred to above. This expedient, however, has not been found essential in the process of the invention.

Figure 2:
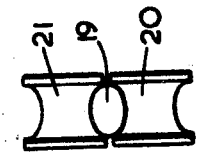

Apparatus according to the invention is shown by way of example in the following diagrammatic drawings, wherein:

Figure 1 is a part sectional side elevation of the complete layout from the extrusion die to the take off rolls;
Figure 2 is a front elevation of the shaping rolls.

Referring now to the drawings: from the tubular die 10, the core 11 of which has a central air passage 12, thermoplastic material 13 is extruded as a tube 14 which is drawn by the draw rolls 15 and 16 through air-cooling rings 17 and 18, through the aperture 19 between the shaping rolls 20 and 21, and through air-cooling rings 22 and 23.

The air-cooling rings 17, 18, 22 and 23 have numerous apertures 24, 25, 26 and 27 arranged round their inner surfaces so as to direct jets of air onto the tube. The rings are connected through inlet pipes 28, 29, 30 and 31, and throttle valves (not shown) with a reservoir of air at atmospheric temperature and under constant pressure.

The central passage 12 of the die core 11 is connected by an inlet pipe and throttle valve (neither shown) to a similar reservoir of air under pressure. Between the inlet pipe and the reservoir an electric heater is provided for heating the air.

The shaping rolls 20 and 21 are of steel and are profiled as shown in Figure 2 to provide an aperture at the nip in the form of an ellipse very slightly greater, in each dimension, than the elliptical cross-section required in the finished tube. The lower roll 20 is mounted in roller bearings carried by the fixed support 32. The upper roll 21 is mounted in roller bearings carried by the frame 33 which is pivotally mounted at 34 on the fixed support 35. A compression spring 36 anchored to the fixed support 35 and to the bridge piece 37 of the frame 33 urges the upper roll 21 towards the lower roll 20.

The draw rolls 15 and 16 are of steel covered with rubber and are slightly profiled to grip the tube. They are urged together by springs (not shown) the compression of which is adjustable and are positively driven through positive infinitely variable gear.

In operation the substantially cylindrical tube emerging from the die is cooled by the air rings 17 and 18 so that it is shaped into elliptical form in passing through the aperture between the shaping rolls. It is further cooled, immediately on emerging from these rolls, by the air ring 22 so that no change in shape occurs after leaving the shaping rolls. The further air ring 23 assists in cooling the tube by the time it reaches the draw rolls 15 and 16 to a temperature at which it can be handled. The draw rolls are operated at such a speed that the tube is stretched between the die and the shaping rolls, i.e. its weight per unit area as it reaches the shaping rolls is less than that at the die (e.g. by 20 to 30%) and in general its thickness as well as its cross-sectional area will be less.

Hot air is copiously supplied from the internal passage 12 in the die core 11, but the pressure is regulated by means of the appropriate throttle valve so that no expansion of the tube occurs. Correct settings for the throttle valves controlling the air flow to the rings 17 and 18 can easily be obtained under any particular set of conditions by observing the effect of varying the air flow. Too much air, owing to too great a cooling effect, results in the tube tending to pass through the shaping rolls without being deformed to the desired shape. Too little air may result in incipient collapse of the tube. Control of air to the air rings 22 and 23 is less critical, in that too great an air flow to these rings does not effect the quality of the tube (except in so far as it may increase the tendency to the deposition plasticizer in the tube) but is, of course, wasteful.

The following example illustrates the invention: It was required to make a tube of cellulose acetate of elliptical cross-section of internal major axis 1.052", internal minor axis 0.509" and thickness 0.010".

The apparatus was as described above with reference to the drawings. The extruder was fitted with a tubular die in which the outer diameter of the core was 1.145" and the inner diameter of the ring was 1.172". The extruder was operated initially at as low a temperature as possible while the tube was threaded through the apparatus. While this was being done the throttle valves, controlling the air flow to the various rings were fully opened and air was supplied through the passage 12 in the die core without operating the air heater. The temperature of extrusion was then raised to about 150° C., the air heater was turned on and the air flow through the passage 12 was controlled so that no expansion of the tube occurred. The draw rolls were operated at such a speed that the extruded tube as it reached the draw-off rolls approximated in shape to a cylinder of internal diameter 0.825" and external diameter 0.845", the cooling being such that the shaping rolls did not substantially affect the shape of the tube passing through them. The cooling air supplied to the rings 17 and 18 was then gradually cut down until the tube emerging from the shaping rolls had the desired elliptical cross section and the speed of the draw rolls was adjusted slightly so that the tube emerging from these rolls had the desired dimensions as determined by applying a suitable gauge to the tube issuing from the rolls.

It will be understood that cross-sectional shapes other than elliptical can easily be obtained by suitable modification of the apparatus described. Thus, by the use of rolls of appropriate profile, tubes of circular, or polygonal, e.g. octagonal or hexagonal, cross-section can be obtained.

If desired, the shaping can be effected by employing two or more pairs of profiled rolls in series.

The invention has been described with particular reference to the extrusion of tubes having a basis of cellulose acetate. The process and apparatus of the invention, however, can be employed with advantage in the extrusion of tubular articles having a basis of other thermoplastics, for example, other thermoplastic substitution derivatives of cellulose such as cellulose propionate, cellulose acetate-propionate, cellulose acetate-butyrate, ethyl cellulose and benzyl cellulose; solid polymers and copolymers of ethylene; thermoplastic polyvinyl compounds, including polystyrene and copolymers of vinyl chloride with a minor proportion of vinyl acetate, of vinylidene chloride with a minor proportion of vinyl chloride, and of vinyl chloride or vinylidene chloride with acrylonitrile or methacrylonitrile; thermoplastic polymers of acrylic acid derivatives, for example polyethyl acrylate and polymethyl methacrylonitrile; and thermoplastic linear condensation polymers such as the nylons, polyethylene terephthalate and poly-4-amino-1.2.4-triazoles. Cellulose esters derived from carboxylic acids containing 2 to 4 carbon atoms, and especially cellulose acetate, are particularly suitable.

The best results have been obtained when the thickness and shape and size of the tube and the material of which it is composed are such that the finished tube when distorted springs back into shape. The thickness of the tube obtained may, for instance, lie between 0.005 and 0.030", according to its size and shape. For circular tubes of diameter between 0.5 and 1.5" made of cellulose acetate or material of similar mechanical properties, and for elliptical tubes both axes of which lie between these limits, thicknesses between 0.008 and 0.015" have proved suitable.

Having described our invention, what we desire to secure by Letters Patent is:

1. In a process for the manufacture of self-supporting tubes of thickness of 0.005 to 0.30 inch of thermoplastic material having a basis of a plasticised cellulose ester of a paraffinic monocarboxylic acid containing 2 to 4 carbon atoms by extruding a tube of the material hot in the absence of volatile liquids, progressively cooling it by means of air jets to a temperature at which it is no longer plastic, while drawing it away from the extrusion point by traction applied at a point at which it has ceased to be plastic, the steps of controlling the cross-sectional shape of the tube by drawing it between the extrusion point and the traction point through an aperture between a pair of contacting, freely rotatable profiled rolls having their axes perpendicular to the direction of travel of the tube and controlling the temperature of the tube so that on reaching said aperture it is soft enough to be deformed, but is not limp, and cooling said tube in said aperture so that on leaving the aperture said tube is hard enough to retain the cross-sectional shape conferred on it by the said rolls, while maintaining the inner surface of the tube out of contact with any supporting surface during the travel of said tube from said extrusion point to the point where said tube leaves said aperture.

2. Process according to claim 1 wherein the aperture between the rolls is circular.

3. Process according to claim 1 wherein the aperture between the rolls is in the shape of a closed, non-circular figure without re-entrant angles.

4. Process according to claim 1 wherein the aperture between the rolls is substantially elliptical.

5. In a process for the manufacture of self-supporting tubes of thickness of 0.005 to 0.30 inch of thermoplastic material having a basis of a plasticised cellulose ester of a paraffinic monocarboxylic acid containing 2-4 carbon atoms by extruding the material hot, in the absence of volatile liquids, in the form of a tube of circular cross-section, and progressively cooling it by means of air jets to a temperature at which it is no longer plastic, while drawing it away from the extrusion point by traction applied at a point at which it has ceased to be plastic, the steps of controlling the cross-sectional shape of the tube by drawing it, while between the extrusion point and the traction point, through an elliptical aperture formed between a pair of contacting, freely rotatable profiled rolls having their axes perpendicular to the direction of travel of the tube and controlling the temperature of the tube so that on reaching said aperture it is soft enough to be deformed, but is not limp, and cooling said tube in said aperture so that on leaving the aperture said tube is hard enough to retain the cross-sectional shape conferred on it by the said rolls, and stretching the tube during its passage to said aperture, while maintaining the inner surface of the tube out of contact with any supporting surface during the travel of said tube from said extrusion point to the point where said tube leaves said aperture.

6. In a process for the manufacture of self-supporting tubes of thickness of 0.005 to 0.30 inch of thermoplastic material having a basis of a plasticised cellulose ester of a paraffinic monocarboxylic acid containing 2-4 carbon atoms by extruding the material hot, in the absence of volatile liquids, in the form of a tube of circular cross-section, and progressively cooling it by means of air jets to a temperature at which it is no longer plastic, while drawing it away from the extrusion point by traction applied at a point at which it has ceased to be plastic, the steps of controlling the cross-sectional shape of the tube by drawing it, while between the extrusion point and the traction point, through an elliptical aperture formed between a pair of contacting, urged together freely rotatable profiled rolls having their axes perpendicular to the direction of travel of the tube and controlling the temperature of the tube so that on reaching said aperture it is soft enough to be deformed, but is not limp, and cooling said tube in said aperture so that on leaving the aperture said tube is hard enough to retain the cross-sectional shape conferred on it by said rolls, and stretching the tube during its passage to said aperture, while maintaining the inner surface of the tube out of contact with any supporting surface during the travel of said tube from said extrusion point to the point where said tube leaves said aperture.

References Cited in the file of this patent

UNITED STATES PATENTS

| Number | Name | Date |
|---|---|---|
| 2,307,817 | Austin | Jan. 12, 1943 |
| 2,422,953 | Davies et al. | June 24, 1947 |
| 2,502,312 | Danner | Mar. 28, 1950 |
| 2,519,375 | Jargstorff et al. | Aug. 22, 1950 |
| 2,528,528 | Lyon | Nov. 7, 1950 |
| 2,529,897 | Bailey et al. | Nov. 14, 1950 |
| 2,708,772 | Moncrieff | May 24, 1955 |